Aug. 8, 1950 J. B. WOOD 2,518,213
FISH LURE
Filed Dec. 10, 1947

J. B. Wood
INVENTOR
BY *CA Snow & Co.*
ATTORNEYS.

Patented Aug. 8, 1950

2,518,213

UNITED STATES PATENT OFFICE 2,518,213

FISH LURE

J. B. Wood, El Dorado, Ark.

Application December 10, 1947, Serial No. 790,860

2 Claims. (Cl. 43—42.47)

This invention relates to fish lures, the primary object of the invention being to provide a fish lure including a forward plate to which the fishing line is connected, the plate having an opening formed adjacent to the upper end thereof, to permit water to pass therethrough, as the lure is being pulled through the water, thereby to hold the lure at a predetermined depth when fishing for a particular type of fish.

Another object of the invention is to provide means for securing the fishing line to the lure, which will be exceptionally strong and durable, to withstand the weight of the lure and heavy fish caught on the hooks, forming a part of the lure.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing

Figure 1:
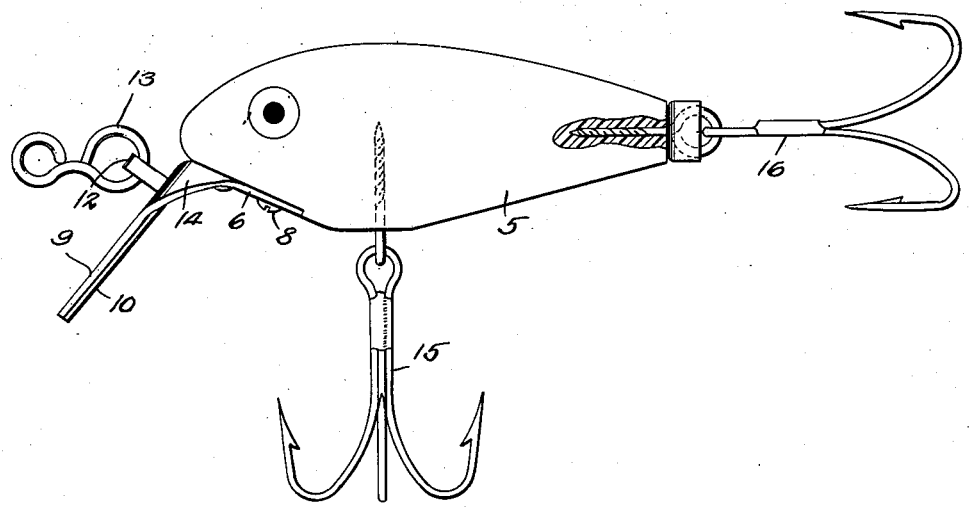
Figure 1 is a side elevational view of a fish lure constructed in accordance with the invention.

Referring to the drawing in detail, the body portion of the lure is indicated by the reference character 5, the body portion being constructed of any desirable buoyant material and of a configuration to resemble the body of a fish.

The plate forming the important feature of the invention comprises a rearwardly extended portion 6 of a width equal to the width of the body portion 5 at the forward end of the body portion, the plate 6 being formed with openings 7 through which securing screws 8 are extended for securing the plate in position at the forward end of the body portion.

The forwardly extended portion 9 of the body portion 5, is formed with rounded edges and is of a width so that portions of the forwardly extended section 9 will be extended laterally beyond the sides of the body portion 5.

Figure 2:
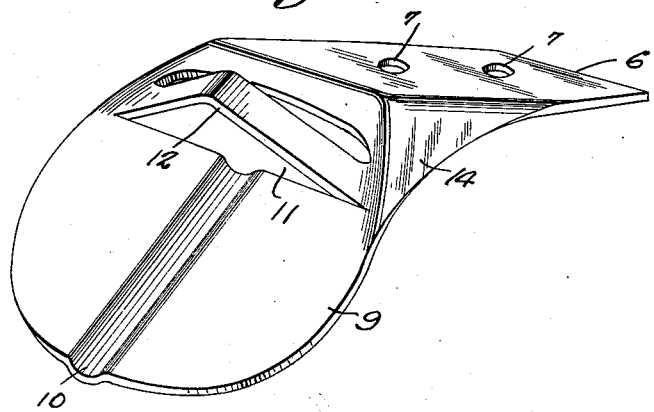
Figure 2 is a perspective view of the plate secured to the forward end of the lure to direct the lure downwardly into the water.

Disposed centrally of the forwardly extended portion 9 and extending from the lower edge thereof, is the groove 10 which extends to the opening 11 formed by punching the section 12 from the forwardly extended portion, and bending the section 12 upwardly as clearly shown by Figure 2 of the drawing. The link 13 is connected to the section 12, the link also providing means whereby the usual fishing line may be connected therewith.

In constructing the forwardly extended portion 9, marginal flanges 14 are provided between the rearwardly extended portion 6 and the forwardly extended portion 9, the marginal flanges providing surfaces against which the water in passing upwardly through the groove 10 and which is directed against the bottom of the rearwardly extension portion 6, is directed steadying the lure.

Hooks 15 are secured to the lower surface of the body portion, at a point intermediate the ends thereof, while the hooks 16 are secured at the rear end or tail of the body portion.

From the foregoing, it will be seen that due to the construction shown and described, I have provided a fish lure which is constructed with a forward plate mounted in such a way that it may be drawn through a body of water with assurance that the body portion will be maintained at a predetermined depth, according to the weight of the body of the lure.

It will also be seen that because of the construction, the lure will be steadied so that the movements thereof will not be too severe and more in keeping with the movements of live bait.

What is claimed is:

1. A fish lure comprising a body shaped to simulate the body of a fish, a plate comprising a rearwardly extended portion secured to the lower surface of the body at the front end thereof, a downwardly extended forward section forming the forward end of the plate, having a transversely disposed elongated opening formed adjacent to the inner end of the forwardly extended portion through which water passes striking the bottom of the body, lateral flanges connecting the rearwardly extended portion of the plate and the downwardly extended forward section at the side edges thereof, and means for securing a fishing line to the lure.

2. A fish lure comprising a body shaped to simulate the body of a fish, a plate comprising a rearwardly extended portion secured to the lower surface of the body at the front end thereof, said plate including a downwardly and forwardly extended portion extending beyond the forward end of the body and having a transversely disposed elongated opening formed adjacent to the rearwardly extended portion through which water passes striking the bottom of the body, said downwardly and forwardly extended portion having a single groove formed in the upper surface thereof and disposed intermediate the side edges thereof, the groove extending from the lower front edge of the downwardly and forwardly extended portion, terminating at the opening, directing water to the opening, lateral flanges connected with the plate restricting lateral movement of the body portion through the water, and means for securing the plate to the body.

J. B. WOOD.

REFERENCES CITED

The following references are of record in the file of this patent:

UNITED STATES PATENTS

| Number | Name | Date |
|---|---|---|
| 1,615,803 | Pflueger | Jan. 25, 1927 |
| 1,903,256 | Catarau | Mar. 28, 1933 |
| 2,180,918 | Verzi | Nov. 21, 1939 |
| 2,231,507 | Richards | Feb. 11, 1941 |